UNITED STATES PATENT OFFICE.

NATHAN FALLEK, OF DENVER, COLORADO, ASSIGNOR TO THE COOK RAILWAY SIGNAL COMPANY, OF DENVER, COLORADO, A CORPORATION OF COLORADO.

STORAGE-BATTERY COMPOUND.

1,060,832.   Specification of Letters Patent.   Patented May 6, 1913.

No Drawing.   Application filed June 17, 1912. Serial No. 704,095.

*To all whom it may concern:*

Be it known that I, NATHAN FALLEK, citizen of the United States, residing in the city and county of Denver and State of Colorado, have invented certain new and useful Improvements in Storage-Battery Compounds; and I do declare the following to be a full, clear, and exact description of the invention, such as will enable others skilled in the art to which it appertains to make and use the same.

My invention relates to a composition of matter for use in a storage battery.

My improved composition consists of sulfuric acid, asbestos, sodium silicate and water.

The composition is prepared in the following manner: The sulfuric acid is poured into distilled water until the specific gravity of the solution is 1.230 when subjected to the hydrometer test. The asbestos, which preferably consists of the white or bleached variety, is mixed with distilled water and boiled preferably for one hour approximately, for the purpose of removing all impurities. This is a washing operation and the asbestos is wrung out of the water and dried until all the water has evaporated. The sodium silicate, which is in the form of a powder, is poured into distilled water until the specific gravity of the solution is raised to 1.180, as indicated by the hydrometer test. In this particular preparation, the sodium silicate is slowly delivered to the water, which is rapidly stirred in order to thoroughly dissolve the said substance. I now have a quantity of dilute sulfuric acid, a quantity of cleansed asbestos, and a quantity of sodium silicate solution.

Assuming that 16 parts by weight represents the quantity of the compound which is to be prepared, I take 12 parts by weight of the dilute sulfuric acid; 3 parts by weight of the cleansed asbestos; and 1 part by weight of the sodium silicate solution, the three elements being thoroughly mixed when in a cold state. The cells of the battery are then filled in the usual manner, that is to say, by filling the spaces between the grids with the compound, which has the consistency of jelly, making an approximately dry battery.

In referring to the hydrometer test for determining specific gravity, in the foregoing specification, it is assumed that the specific gravity of distilled water is 1.000.

Having thus described my invention, what I claim is:

1. A storage battery compound composed of cleansed asbestos; a solution of sulfuric acid and distilled water, whose specific gravity is 1.230; and a solution of sodium silicate whose specific gravity is 1.180, the said elements being combined in the proportion of 12 parts by weight of the solution of sulfuric acid; 3 parts by weight of the asbestos; and one part by weight of the sodium silicate.

2. A storage battery compound composed of asbestos, a solution of sulfuric acid and water having a specific gravity of approximately 1.230, and a solution of sodium silicate and water having a specific gravity of approximately 1.180, the said elements being combined in the proportion, substantially, of twelve parts by weight of the sulfuric acid solution and three parts by weight of the asbestos, and one part by weight of the sodium silicate solution.

3. A storage battery compound composed of asbestos, dilute sulfuric acid and a solution of sodium silicate and water combined in the proportions, substantially, of twelve parts by weight of sulphuric acid, three parts by weight of asbestos, and one part by weight of sodium silicate solution.

In testimony whereof, I affix my signature in presence of two witnesses.

NATHAN FALLEK.

Witnesses:
A. J. O'BRIEN,
MAY CLEMENTS.